United States Patent [19]

Thelen et al.

[11] Patent Number: 5,182,517
[45] Date of Patent: Jan. 26, 1993

[54] METHOD FOR DETECTING THE MOTION AND POSITION STATE OF A COMPONENT OF AN INDUCTIVE ELECTRIC LOAD, WHICH COMPONENT CAN BE MOVED BETWEEN TWO END POSITIONS BY MEANS OF MAGNETIC INTERACTION

[75] Inventors: Ulrich Thelen, Esslingen; Thomas Hirth, Stuttgart, both of Fed. Rep. of Germany

[73] Assignee: Daimler-Benz AG, Fed. Rep. of Germany

[21] Appl. No.: 626,566

[22] Filed: Dec. 12, 1990

[30] Foreign Application Priority Data

Dec. 23, 1989 [DE] Fed. Rep. of Germany ....... 3942836

[51] Int. Cl.$^5$ ............................................. G01R 31/02
[52] U.S. Cl. .................................. 324/418; 340/644; 324/423; 324/545; 361/152
[58] Field of Search ............... 324/418, 423, 415, 545; 340/644; 361/152

[56] References Cited

U.S. PATENT DOCUMENTS

| 3,059,176 | 10/1962 | Richter et al. | 324/423 |
| 3,241,063 | 3/1966 | Beattie et al. | 324/423 |
| 4,319,193 | 3/1982 | Boccali et al. | 324/418 |
| 4,447,849 | 5/1984 | Harwell | 361/152 |
| 4,612,597 | 9/1986 | Hamren | 361/152 |
| 4,620,259 | 10/1986 | Oshizawa | 361/152 |
| 4,672,310 | 6/1987 | Sayed | 340/644 |
| 4,823,825 | 4/1989 | Buchl | 361/152 |

FOREIGN PATENT DOCUMENTS

| 2347200 | 4/1975 | Fed. Rep. of Germany | 324/418 |
| 2739028 | 3/1979 | Fed. Rep. of Germany | 324/423 |

*Primary Examiner*—Jack B. Harvey
*Assistant Examiner*—Maura K. Regan
*Attorney, Agent, or Firm*—Evenson, Wands, Edwards, Lenahan & McKeown

[57] ABSTRACT

A method for detecting the motion and position state of a component of an inductive electric load. The component can be moved between two end positions by magnetic interaction, in which the total waveform of the drive current is divided into a plurality of states. By evaluating these individual states, comprehensive error diagnostics and a setting of operating parameters of the inductive electric load to operating conditions are possible.

25 Claims, 2 Drawing Sheets

METHOD FOR DETECTING THE MOTION AND POSITION STATE OF A COMPONENT OF AN INDUCTIVE ELECTRIC LOAD, WHICH COMPONENT CAN BE MOVED BETWEEN TWO END POSITIONS BY MEANS OF MAGNETIC INTERACTION

BACKGROUND AND SUMMARY OF THE INVENTION

The invention relates to a method for detecting the motion and position state of a component of an inductive electric load, which component can be moved between two end positions by means of magnetic interaction.

A method of the generic type is already known from DE 3,817,770 A1, according to which the waveform of the drive current of a switching valve is examined in order to be able to detect when the armature of the switching valve is in motion. To do this a logic operation is carried out on the drive signal for the switching valve and the time derivative of the drive current in such a way that it is possible to detect when the armature of the switching valve is in motion. If it is detected when current is applied to the switching valve that the armature of the switching valve has started to move, the drive current is reduced so that only relatively little power need be converted in the switching valve. In addition, error diagnostics are carried out as a result of determining the transit times of the armature of the switching valve.

With this method, in some circumstances it could be considered a disadvantage that in the course of error diagnostics only the transit times of the armature of the switching valve are taken into account without going into the operating conditions of the switching valve such as, for example, the operating temperature or the vehicle electrical system voltage. With a lower operating temperature the transit time is extended without any malfunction of the switching valve being present. In addition, the excitation current is reduced without taking operating conditions into account. Furthermore, it is advisable for the signal to be filtered when determining the time derivative, so that a change in the magnitude of the excitation current can occur at the earliest with a time delay corresponding to the filter time constant.

Furthermore, a method is already generally known from the field of error diagnostics, according to which errors or states of components participating in a process are detected in that values characterizing the behavior of the process are recorded. These values characterizing the behavior of the process are combined with one another using model equations describing the process, these model equations being determined by a particular parameter set in the case of fault-free components. If, given variable parameters, the model equations are then solved for the currently measured values characterizing the behavior of the process, then it is possible to infer, from a deviation of the parameters of the currently determined parameter set from the particular parameter set, faults at one or more components, if the effects of faults of one or more components on changes to one or more parameters of the parameter set are known a priori.

With this method it would only be possible with a very large outlay to detect, during the switching operation of a component of an inductive electric load, which component can be moved between two end positions by means of magnetic interaction, and which state the movable component currently exhibits. This assignment of the states of the movable component to individual times would be fraught with great uncertainties.

It is also known (DE 3,435,465 AL) to test loads driven by a processing routine in a control device in that these loads receive test signals from test routines when the loads are not driven by the processing routine of the control device.

Disadvantages arise from this method in that a test can only take place if the loads are not being driven by the processing routine, so that no information on the instantaneous state of the movable component can be deduced.

It is furthermore known (DE 2,610,558 AL) to detect when a load has reached the end position during a switching operation by means of a switch which is operated by the load when the latter has reached the end position.

In this case it is disadvantageous that an additional switch must be present, which entails additional costs and also represents a source of errors.

The object of the invention is to develop as simple a method as possible with which it is possible to infer, with the greatest possible reliability and short time delays, the instantaneous motion and position state of a component of an inductive electrical load, which component can be moved between two end positions by means of magnetic interaction.

In a method of the generic type for detecting the motion and position state of a component of an inductive electric load, in which the component can be moved between two end positions by means of magnetic interaction, this object is achieved according to the invention.

Further advantages of the invention in comparison with the know prior art are that, from the detection that the end position of the component of an inductive electric load which is movable by means of magnetic interaction has been reached, it is possible to relate the holding current $I_{Hold}$ for this end position to the drive current required for reaching the end position. Moreover, it is possible to infer possible defects of the inductive electric load from a change in the magnitude of the drive current required for reaching the end position in comparison with a reference value for this drive current. In addition, a faster reaction to time variations of the drive current is possible by access to intermediate values of a differentiating unit.

The drive current of an inductive electric load with a component movable by means of magnetic interaction has, as a result of the movement of the movable component, a characteristic waveform such that the direction of change of the drive current changes when the movable component starts moving out of its end position. For this reason, in the method according to the invention a differentiation of the drive current of the inductive electric load is carried out, so that it can be detected from a change in the direction of change of the drive current whether the movable component is starting to move out of one of its end positions or whether the target position has been reached. It is also possible to make deductions regarding operating conditions or malfunctions of the inductive electric load from the waveform of the drive current while the movable component is at rest.

If it is detected that the movable component is starting to move out of one of its two end positions, it is possible, for example, to relate the holding current $I_{Hold}$ for the movable component to the drive current which was necessary to set the movable component in motion. Thus it is possible in a simple manner to compensate changes in the dynamics of the movable component as a result of temperature fluctuations or as a result of fluctuations in the vehicle without applying an unnecessarily large holding current $I_{Hold}$. In this case, the holding current $I_{Hold}$ can, for example, increase linearly with the magnitude of the drive current necessary for setting the movable component in motion.

An exemplary embodiment of the invention is illustrated diagrammatically in the drawing and is described in greater detail below. In this, the relationships for a switching valve are represented without restricting the generality. The switching valve here corresponds to the inductive electric load and the switching valve armature corresponds to the movable component. The relationships can be transferred analogously to further exemplary embodiments such as, for example, a relay.

Figure 1:
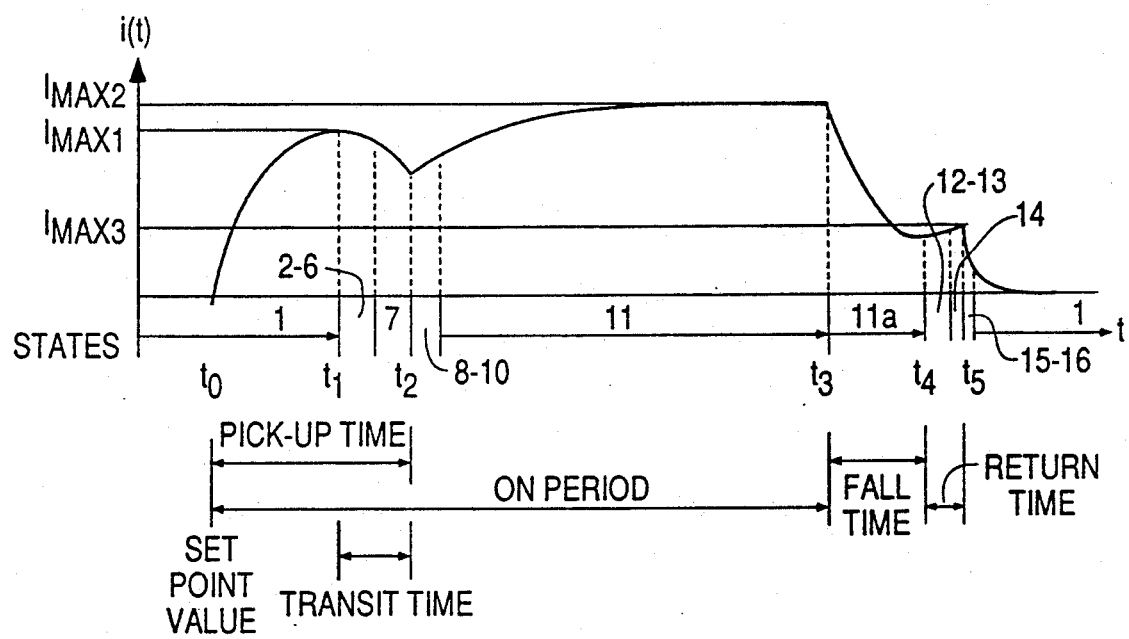
FIG. 1 shows a representation of the waveform of the drive current of a switching valve.

The switching valve represents an inductive electric load, so that a waveform of the drive current in accordance with the representation of FIG. 1 is produced. At time $t_o$ a setpoint value of a drive current is fed to the switching valve, the current having an order of magnitude such that the switching valve armature starts to move out of its rest position towards its end position when the value of the drive current reaches this setpoint value. The drive current thereupon increases with a response delay according to the equation:

$$i(t) = I_{maxi1} * (1 - \exp\{-(t-t_o)/t_{out}\})$$

At time $t_1$ the switching valve armature starts to move so that, as a result of Lenz's rule, this motion of the switching valve armature induces such a voltage that it counteracts its cause—the drive current. Thus, overall a reduction in the drive current is produced for the time period from the time $t_1$ to the time $t_2$, at which the switching valve armature has come to its end position. Since the magnetic circuit is then closed, from the time $t_2$ to the time $t_3$, at which the setpoint value of the drive current fed to the switching valve becomes equal to zero, the drive current increases with the time constant $t_{in}$, which is greater that the time constant $t_{out}$, according to the equation:

$$i(t) = I_{max2} * (1 - \exp\{-(t-t_2)/t_{in}\})$$

At time $t_3$ the switching valve armature does not yet immediately start moving towards its rest position, since a voltage is induced which counteracts the sudden decrease in the drive current and thus leads to a timedelayed fall in the drive current. This falling drive current therefore holds the switching valve armature in the end position up to time $t_4$. At time $t_4$ the drive current is below the holding current $I_{Hold}$ necessary for holding the end position, so that the switching the magnetic circuit is still closed, the drive current falls from time period $t_3$ to time period $t_4$ with the time constant $t_{in}$, according to the equation:

$$i(t) = I_{max2} * \exp\{-(t-t_3)/t_{in}\}$$

The movement of the switching valve armature out of the end position towards its rest position from time $t_4$ until the rest position is reached at time $t_5$ causes an induction of a voltage which is directed against the cause of the movement of the switching valve armature—the falling armature current. Thus an increase in the drive current can be determined in the time period from $t_4$ to $t_5$. Once the rest position has been reached at time $t_5$, the drive current falls as a result of the opened magnetic circuit with the time constant $t_{out}$, according to the equation:

$$i(t) = I_{max3} * \exp\{-(t-t_5)/t_{out}\}$$

In an evaluation of the characteristic values of this waveform of the drive current as a function of time, it is possible to stipulate the value of the holding current $I_{Hold}$ of the switching valve armature as a function of the current at time $t_1$ or at time $t_2$. This dependency can here be such that the holding current $I_{Hold}$ increases linearly with the magnitude of the corresponding current at time $t_1$ or $t_2$. For this it is necessary to carry out differentiation of the waveform of the drive current in order to be able to detect the change in direction of the waveform from the time $t_1$ to the time $t_2$ in comparison with the direction of the waveform from the time $t_o$ to the time $t_1$ and hence the time $t_1$. It correspondingly applies that a differentiation of the waveform of the drive current must be carried out in order to detect the change in direction of the waveform from the time $t_2$ to the time $t_3$ in comparison with the direction of the waveform from the time $t_1$ to the time $t_2$ and hence the time $t_2$ if the holding current $I_{Hold}$ is to be related to the value of the drive current at time $t_2$. Furthermore, from the measured waveform of the drive current it is possible to carry out an identification of the parameters of the individual parts of the waveform of the drive current in accordance with the equations stated. By comparing the parameters determined o the basis of the parameter identification with associated reference value it is thus possible to infer operating conditions or malfunctions. The time constants $t_{in}$ and $t_{out}$ depend on the switching valve employed and ar obtained from the ohmic resistance and the inductive reactance.

Figure 2:
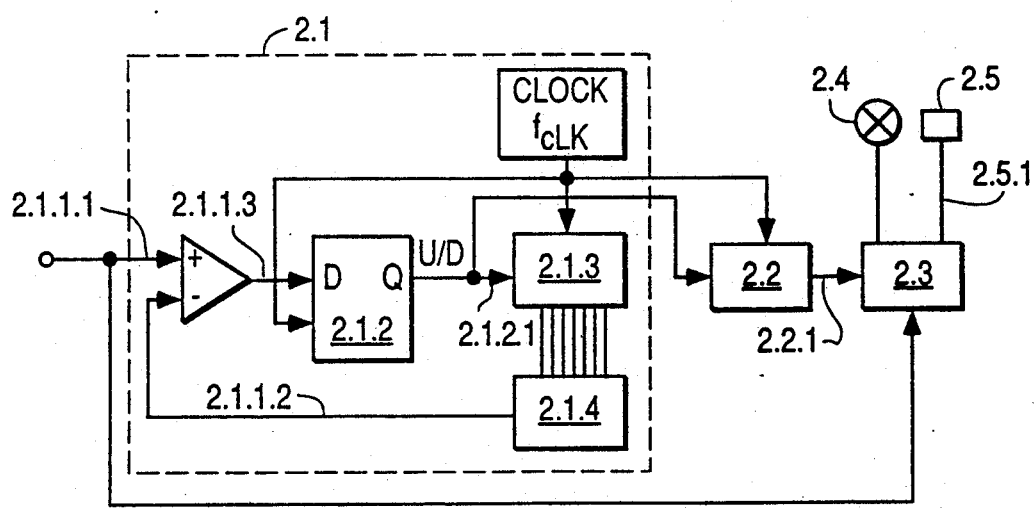
FIG. 2 shows a device for carrying out the differentiation of the drive current, for representing the states of the switching valve armature and for evaluating these states for deriving further parameters.

As shown in FIG. 2, a differentiation of the drive current of the switching valve is carried out in a device part 2. The increase in the drive current of the switching valve is inferred by means of an up/down signal (U/D signal) in a state recognition device 4. In this arrangement, the drive current of the switching valve is differentiated in the exemplary embodiment of FIG. 2. In an input comparator 6, the value of the currently measured drive current is compared with a value of the drive current simulated in a 7-bit counter 8 in the last clock cycle. The value of the 7-bit counter 8 is converted by an A/D converter 10 into an analog value and is fed a signal line 12 to the input comparator 6. The value of the currently measured drive current is fed to the input comparator 6 via a signal line 14. An output signal 16 of the input comparator 6 is fed to a flip-flop 18 and thus, by means of an output signal 20 (U/D signal) in each clock cycle, causes an incrementing or decrementing of the 7-bit counter 8 by one bit, the counting direction depending on whether the currently measured drive current is greater or less than the drive current measured during the last clock cycle. This U/D signal is fed to the state recognition device 4, in which the increase in the drive current is determined from the number of steps which the value of the 7 bit counter 8 is incremented or decremented. This can be carried out, for example, in accordance with the method represented in FIG. 3. A suitable setting of the clock frequency $f_{CLK}$ should also be ensured in the device part 2. Since the 7-bit counter 8 can be increased or decreased during a clock period by only one lowest-order bit, the clock frequency $f_{CLK}$ must be set as a function of the greatest possible occurring time derivative $S_{max}$ of the drive current and of the resolution $[V_{res}]$ of the 7-bit counter. The resolution $V_{res}$ is obtained here from the greatest possible value representable by the 7-bit counter divided by the states representable by the 7-bit counter. The following is thus obtained for the clock frequency $f_{CLK}$:

$$f_{CLK} = SR_{max}/V_{res}$$

The states of the switching valve detected by the state recognition device are then fed via a signal line 22 to an evaluation unit 24. In addition, the value of the currently measured drive current can also be fed to the evaluation unit 24. In the evaluation unit 24 it is then possible, for example, to compare various values. Characterizing the movement of the valve armature with predetermined reference values to see whether the deviations exceed respective predetermined threshold values. Suitable values for characterizing the movement of the valve armature are, for example, the length of the time periods ($t_4-t_5$) or ($t_2-t_1$), or the drive currents at the times $t_1$ or $t_4$ at which the valve armature has just started to move out of the rest or end position. From the measured waveform of the drive current, it is likewise possible to carry out an identification of the parameters of the individual parts of the waveform of the drive current in accordance with the equation stated in the description of FIG. 1. It is thus possible to infer operating conditions or malfunctions by comparing the parameters determined on the basis of the parameter identification with associated reference values. If a deviation of one of these values from the associated reference value above a threshold value is detected, it is possible, for example, to drive an information output unit. In the exemplary embodiment of FIG. 2, this information output unit is represented as a lamp 26. It is likewise possible, for example, to relate the magnitude of the holding current $I_{Hold}$, which is to hold the valve armature in its end position, to the magnitude of the drive current which had become set at time $t_1$ when the valve armature started to move. In this way an adaptive setting of the holding current $I_{Hold}$ to varying environmental conditions such as, for example, the temperature of the switching valve or voltage fluctuations in the electrical system of a motor vehicle is possible. The assignment of the magnitude of the holding current $I_{Hold}$ to the magnitude of the drive current which had become set at time $t_1$ depends here on the operating conditions of the switching valve, such as vibrations for example. If a setpoint value for a holding current $I_{Hold}$ was determined in the evaluation unit 24, then this value can be fed via a signal line 28, then this value can be fed via a signal line 28 to a controlling system 30 for setting this holding current $I_{Hold}$.

Figure 3:
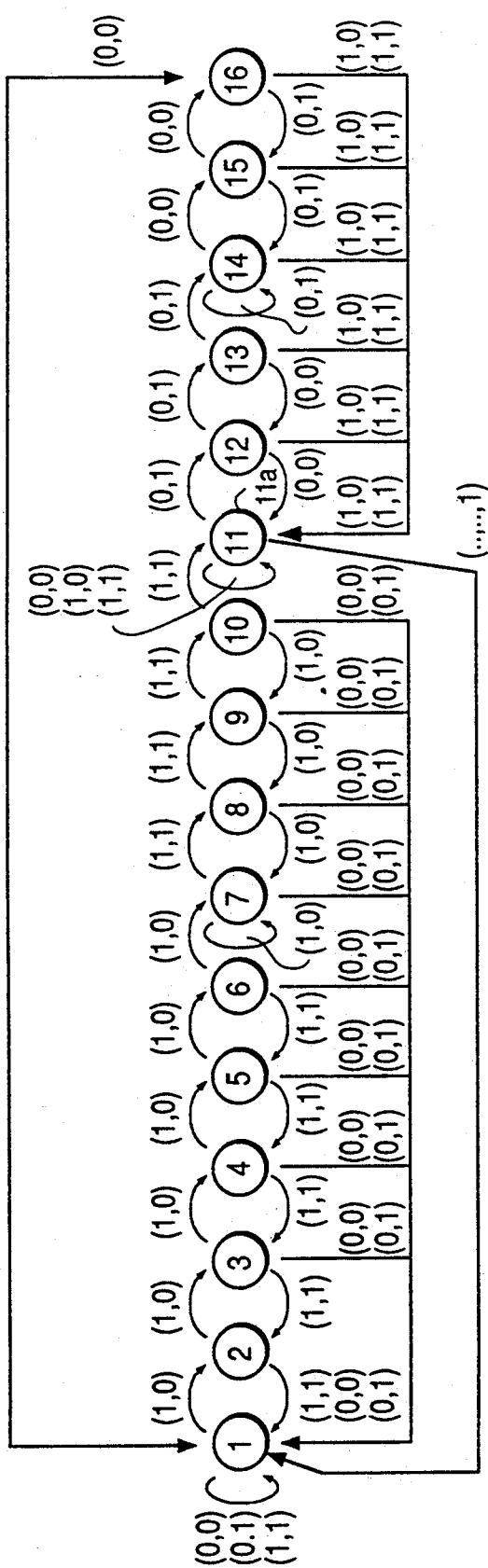
FIG. 3 shows a representation of the description of the states of the switching valve armature.

It can be seen from the representation of FIG. 3 that the waveform of the drive current can be divided into several states, this division being into 16 states in the present exemplary embodiment. A transition from one state into another is detected on the basis of a parameter set, the parameter set consisting of two single parameter in the present exemplary embodiment. The first of these parameters describes the setpoint value of the drive current, the value of this parameter being equal to 1 when the setpoint value of the drive current assumes a value such that the switching valve armature starts to move out of its rest position towards its end position when the value of the drive current corresponds to this set point value. If the setpoint value of the drive current is equal to 0, then the value of this first parameter is likewise equal to 0. The second of these parameters describes the increase in the drive current over time (U/D signal). If the drive current increases, this parameter assumes the value 1. If the drive current remains constant or becomes smaller, this parameter assumes the value 0.

The state 1 corresponds here to the time period from $t_0$ to $t_1$. This state is characterized by the fact that the setpoint valve of the drive current fed to the switching valve assumes an order of magnitude such that the first parameter of the parameter set assumes the value 1. This leads to the drive current increasing monotonously during this time period. This state 1 is retained if the parameters of the parameter set have the value (1,1).

If such a setpoint value of the drive current is fed to the switching value that the first parameter of the parameter set assumes the value 1, and if it is determined at the same time that the drive current is falling—that is to say that the second parameter of the parameter set assumes the value 0—then the switching valve changes to a state 2 if the switching valve was previously in the state 1. The parameters of the parameter set then have the value (1,0). This state 2 returns to the state 1 when the drive current is increasing, without it having previously been detected that the end position was reached at time $t_2$. The parameters of the parameter set then have the value (1,1). This ensures that the time variation of the drive current is evaluated with a filtering, so that no short-term interference in the drive current can lead to an evaluation of the drive current which leads to an incorrect interpretation of the state. This filtering can also be carried out, for example, by employing analog or digital filters known per se, in which case it is then expediently inferred that the switching valve armature has started to move if the time period during which the drive current was falling monotonously falls below a predetermined threshold value.

In the exemplary embodiment of FIG. 3, this is realized in that a check is made at given time intervals as to whether the instantaneously measured drive current is greater or less than the drive current measured at the last time. Starting from the state 2, a transition to states 3, 4, 5 and 6 then takes place when a setpoint value of the drive current is fed to the switching valve, which leads to the first parameter of the parameter set assuming the value 1, and if it is determined at the same time at the given time intervals that the instantaneously measured drive current is less than the drive current measured at the respective last time. This means that the parameters of the parameter set assume the value combination (1,0) at each of these transitions. If it is determined during one of the states 2 to 6 that the instantaneously present drive current is greater than the drive current measured at the respective last time, the number of the current state is decreased by 1. The parameters of the parameter set then have the value combination (1,1). If appropriate, this takes place until the state 1 is reached again.

By means of this characterization of the waveform of the drive current by means of individual states, it is possible, for example, to reduce the drive current when the switching valve armature has started to move, conditional upon the type of the filtering with a very short time constant. In the exemplary embodiment represented in FIG. 3, the actual filtering is only completed when the state 7 has been reached. A reduction in the drive current can then, however, for example, already take place once the state 3 has been reached. If in this case the drive current is reduced too much, a return to state 2 takes place, in which case the drive current can then be increased again. If the state 2 is reached, and if the drive current is to be reduced as a function of the magnitude of the drive current at time $t_1$, it is possible to determine the magnitude of the reduced drive current already during the filtering. If appropriate, it is thus possible to initiate measures before the filtering has been completed.

If it is detected in the state 6 that the instantaneously measured drive current is less than the drive current measured at the last time, the state 7 is detected. The parameters of the parameter set then have the value combination (1,0). If the drive current falls further, the state 7 remains until the end position of the switching value armature is reached at time $t_2$.

If such a setpoint value of the drive current is fed to the switching valve that the first parameter of the parameter set assuming the value 1, and if it is determined at the same time that the drive current is increasing when the switching valve was previously in the state 7, then the reaching of the end position of the switching valve armature is detected at time $t_2$, and the switching valve changes to a state 8. The parameters of the parameter set then have the value combination (1,1). This state 8 returns to the state 7 when the switching valve receives a drive current and this drive current is falling. The parameters of the parameter set then have the value combination (1,0).

Here, too, the time variation in the drive current is expediently evaluated with a filtering, so that no short-term interference in the drive current can lead to an evaluation of the drive current which leads to an incorrect interpretation of the state. This filtering can also be carried out here, for example, by employing analog or digital filters known per se, in which case a reaching of the end position of the switching valve armature is expediently inferred when the time period during which the drive current was monotonously increasing exceeds a predetermined threshold value.

In the exemplary embodiment of FIG. 3, this is realized in that a check is made at given time intervals as to whether the instantaneously measured drive current is greater or less than the drive current measured at the last time. Starting from the state 7, a transition to states 8, 9 and 10 then takes place when such a setpoint value of the drive current is fed to the switching valve that the first parameter of the parameter set assuming the value 1, and if it is determined at the same time at the given time intervals that the instantaneously measured drive is greater than the drive current measured at the respective last time. This means that the parameters of the parameter set have the value combination (1,1). If it is determined during one of the states 8 to 10 that the instantaneously measured drive current is less than the drive current measured at the respective last time, the number of the current state is decreased by 1. The parameters of the parameter set then have the value combination (1,0). If appropriate, this takes place until the state 7 is reached again. In this case, too, analogously to the description of the relationships for the states 2 to 6, measures can be initiated early before the end of the actual filtering, by not waiting for the state 11 to be reached, but rather taking measures already when one of the states 8 to 10 is reached.

If a setpoint value of the drive current corresponding to a value 0 is fed to the switching valve during one of the described states 1 to 10, then an assignment takes place to the state 1 irrespective of whether the drive current is increasing or falling. The parameters of the parameter set then have one of the value combinations (0,0) or (0,1).

If it is detected in the state 10 that the instantaneously measured drive current is greater than the drive current measured at the last time, the state 11 is detected. The parameters of the parameter set then have the value combination (1,1). This state 11 is only left once time $t_4$ has been reached. This means that the state is retained when the parameters of the parameter set have one of the value combinations (0,0), (1,0), (1,1). However, it is also possible to divide the state 11 into further individual states so that, for example, a new state 11a begins at time $t_3$. The transition from the state 11 to this state 11a then takes place when the parameters of the parameter set assume one of the value combinations (0,0) or (0,1). It is thus possible, for example, to deduce information on the movability of the switching valve armature from the length of the time period ($t_4 - t_3$).

In the exemplary embodiment represented in FIG. 3, the state 11 remains until time $t_4$, that is to say the state 12 is detected whenever the setpoint value of the drive current fed to the switching valve is equal to 0, and if at the same time the drive current is increasing. The parameters of the parameter set then have the value combination (0,1).

In addition to this criterion for the transition into the state 12, the parameter set can also be extended to include a further parameter. This third parameter here assumes the value 0 when the value of the drive current is above a threshold value, and this third parameter here assumes the value 1 when the value of the drive current is below the threshold value. The threshold value can here be in the order of magnitude of 5% of the value of the current $I_{max1}$. If it is detected here in the state 11 that the third parameter assumes the value 1, then a resetting to the state 1 can take place.

In this case none of the states 12-16 was detected. This can take place whenever the increase in the drive current between the two times $t_4$ and $t_5$ is so weak and/or so short that, starting from the state 11, no transition to higher states takes place. The state 12 returns to the state 11 when the setpoint value of the drive current fed to the switching valve is equal to 0, and if the drive current is falling. The parameters of the parameter set then have the value combination (0,0). Here, too, the time variation in the drive current is expediently evaluated with a filtering, so that no short-term interference in the drive current can lead to an evaluation of the drive current which leads to an incorrect interpretation of the state. This filtering can also be carried out here, for example, by employing known analog or digital filters, in which case it is then expediently inferred that the switching valve armature has moved out of the end position towards the rest position when the time period during which the control current was monotonously increasing exceeds a predetermined threshold value.

In the exemplary embodiment of FIG. 3, this is realized in that a check is made at given time intervals as to whether the instantaneously measured drive current is greater or less than the drive current measured at the last time. Starting from the state 12, a transition to a state 13 then takes place when the setpoint value of the drive current fed to the switching valve is equal to 0, and if it is determined at the same time at the given time intervals that the instantaneously measured drive current is greater than the drive current measured at the respective last time. The parameters of the parameter set then have the value combination (0,1). If it is determined during the state 13 that the instantaneously measured drive current is less than the drive current measured at the last time, the number of the current state is decreased by 1, so that the state 12 is reached again. The parameters of the parameter set then have the value combination (0, 0). If it is determined during the state 13 that the instantaneously measured drive current is greater than the drive current measured at the last time, a transition to the state 14 takes place. The parameters of the parameter set then have the value combination (0,1).

This state 14 is retained in this case when the drive current increases again, that is to say when the parameters of the parameter set assume the value combination (0,1). In this case it is detected that the rest position of the switching valve armature has been reached at time $t_5$ when the setpoint value of the drive current fed to the switching valve is equal to 0, and when the drive current is becoming smaller. The parameters of the parameter set then have the value combination (0,0) and a transition to the state 15 takes place. If it is determined during the state 15 that the drive current is continuing to fall, a transition to the state 16 takes place. The parameters of the parameter set then have the value combination (0,0). If the setpoint value of the drive current fed to the switching valve during the state 16 then continues to be equal to 0, a return to the state 1 takes place if the drive current continues to become smaller. The parameters of the parameter set then have the value combination (0,0). If the drive current increases during one of the states 15 or 16, and if the setpoint value of the drive current fed to the switching valve is equal to 0, then the number of the current state is decreased by 1. The parameters of the parameter set then have the value combination (0,1).

If a setpoint value of the drive current is fed to the switching valve during one of the states 12 to 16 which leads to the first parameter of the parameter set assuming the value 1, a return to the state 11 take place irrespective of whether the drive current is increasing or decreasing. The parameters of the parameter set then have one of the value combinations (1,0) or (1,1).

A variation of the exemplary embodiment of FIG. 3 is obtained, for example, in that the filter time constants during the differentiation of the drive current are selected differently, so that a different division of the individual states is produced analogously to the exemplary embodiment of FIG. 3.

Figure 4:
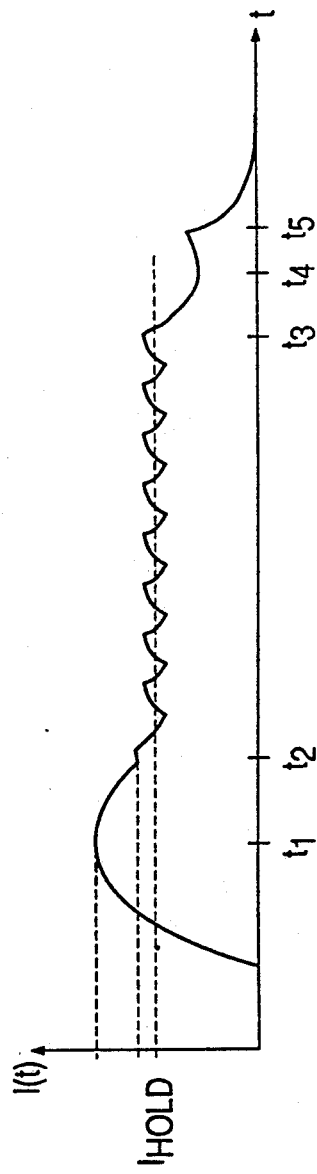
FIG. 4 shows a representation of the waveform of the drive current given clocked current supply to the switching valve.

FIG. 4 shows a characteristic waveform of the drive current of a switching valve in which, after it has been detected that the end position of the switching valve armature has been reached, a clocked current supply takes place, so that a mean holding current $I_{Hold}$ is set which, in accordance with the representation of FIG. 4, is related to the drive current flowing at time $t_2$ and is, for example, 80% of this drive current. It is likewise also possible to relate the holding current $I_{Hold}$ to the drive current flowing at time $t_1$, in which case the holding current $I_{Hold}$ is then in the order or magnitude of about 70–80% of this current.

We claim:

1. A method for detecting an instantaneous motion and position state of a movable inductive electric load component which is moved between two end positions by magnetic interaction, comprising the steps of:
    dividing the total waveform of the drive current of the inductive electric load into a plurality of states which characterize the instantaneous motion and position state of the movable component;
    determining a parameter set from at least two parameters assuming binary values, in which a first parameter of the two parameters characterizes a setpoint value of the drive current, the first parameter being the value 1 when the inductive electric load starts to move out of its rest position and being the value 0 when the inductive electric load is at rest and in which the second parameter characterizes a direction of change of the drive current to determine if the drive current is increasing or decreasing the second parameter being the value 1 when the drive current increases and being the value 0 when the drive current is constant or decreasing;
    evaluating the change in direction of the drive current as a function of the set point value of the drive current if the inductive electric load is in motion; and
    transitioning from a first motion and position state of the inductive electric load into a second motion and position state of the inductive electric load when the values of the parameters the parameter set change 2. A method according to claim 1, further comprising the steps of:
    determining a third parameter which characterizes the idle position of the movable component, in which the third parameter assumes the value 0 when the value of the drive current is above a threshold value, and in which the third parameter assumes the value 1 when the value of the drive current is below the threshold value; and
    determining that the movable component is in its rest position when the third parameter assumes the value 1.

3. A method according to claim 1, further comprising the steps of:
    assigning the motion and position state of the movable component to a state 1 when the setpoint value of the drive current is stipulated for the inductive electric load such that the first parameter assumes the value 1; and
    detecting that the movable component has not yet started to move out of its rest position, from the fact that the drive current is increasing strictly monotonously after a change of the setpoint value of the drive current from the value 0 to such a value that the first parameter of the parameter set assumes the value 1.

4. A method according to claim 3, further comprising the steps of:
characterizing a change in the motion and position state of the movable component such that the movable component starts to move out of its rest position towards its end position by a state 2; and
detecting the change in the motion and position state when the motion and position state is instantaneously characterized by the state 1 and when the two first parameters of the parameter set assume the value combination (1,0), this time being denoted by $t_1$.

5. A method according to claim 4, further comprising the steps of:
executing a signal filtering including incrementing the states given a constant value combination (1,0) of the two first parameters of the parameter set;
decrementing the states, given a value combination (1,1) of the two first parameters of the parameter set, until either the state 1 is reached or a state with the number x; and
reliably determining therefrom that the movable component has started to move.

6. A method according to claim 5, further comprising the steps of:
detecting that the end position of the movable component has been reached when the instantaneous state corresponds to the state with the number x, and
determining that the drive current is increasing again, so that the two first parameters of the parameter set have the value combination (1,1) the state then being incremented and this time being denoted by $t_2$.

7. A method according to claim 6, further comprising the step of:
filtering a signal such that the states are incremented given a constant value combination (1,1) of the two first parameters of the parameter set;
decrementing the states, given a value combination (1,0) of the two first parameters of the parameter set, until either the state is reached or a state with the number y, is reached, and
determining reliably therefrom that the movable component has reached its end position.

8. A method according to claim 3, further comprising the step of characterizing the motion and position state of the movable component by the state 1 when the first parameter of the parameter set assumes the value 0, before it has been reliably detected that the end position of the movable component has been reached.

9. A method according to claim 6, further comprising the step of incrementing from the state characterizing that the end position of the movable component has been reliably reached at the time $t_2$ when the setpoint value of the drive current is equal to 0, this time being denoted by t*p751y3.

10. A method according to claim 9, further comprising the step, starting from a state z which describes that the movable component is still in its end position from the time $t_3$ and that the first parameter of the parameter set assumes the value 0, of incrementing the state when the second parameter of the parameter set assumes the value 1, this time being denoted by $t_4$.

11. A method according to claim 10, further comprising the steps of:
filtering a signal such that the states are incremented given a constant value combination (0,1) of the two first parameters of the parameter set;
decrementing the states, given a value combination (0,0) of the two first parameters of the parameter set, until either the state z is reached or a state with the number u, is reached, and
determining reliably therefrom that the movable component is moving out of the end position towards its rest position.

12. A method according to claim 10, further comprising the step of incrementing the state, starting from the state which characterizes the motion and position state that the movable component is moving from the end position towards its rest position from the time $t_4$, when the two first parameters of the parameter set have the value combination (0,0), this time being denoted by $t_5$.

13. A method according to claim 11, further comprising the steps of:
filtering a signal such that the states are incremented given a constant value combination (0,0) of the two first parameters of the parameter set;
decrementing the states, given a value combination (0,1) of the two first parameters of the parameter set, until either the state u is reached or a state with the number v is reached, and
determining reliably therefrom that the movable component has reached its rest position.

14. A method according to claim 13, further comprising the step of changing states from the state with the number v to the state with the number 1 when the two first parameters of the parameter set have the value combination (0,0).

15. A method according to claim 3, further comprising the step of assigning the instantaneous state to the state which characterizes that the movable component has reliably reached the end position when the first parameter assumes the value 1 during the time period during which the movable component is moving towards the rest position.

16. A method according to claim 6, further comprising the step of relating a holding current for holding the movable component in the end position from the time $t_2$ to the magnitude of the drive current flowing at the time $t_1$.

17. A method according to claim 6, further comprising the step of relating a holding current for holding the movable component in the end position from the time $t_2$ to the magnitude of the drive current flowing at time $t_2$.

18. A method according to claim 12, further comprising the step of detecting operating conditions or malfunctions of the inductive electric load by determining constants characterizing the waveform of the drive current and by comparing these constants with predetermined reference values.

19. A method according to claim 18, further comprising the step of characterizing the waveform of the drive current according to one or more constants:
a time constant $t_{out}$ characterizing a temporal fall between from a time $t_5$ and also the temporal increase between the times $t_0$ and $t_1$,
a time constant $t_{in}$ characterizing a temporal fall between times $t_3$ and $t_4$ and also the temporal increase between times $t_2$ and $t_3$, at least one of time periods $(t_1-t_0)$, $(t_2-t_1)$, $(t_4\ t_3)$, $(t_5-t_4)$, and at least one of constants $I_{max1}$, $I_{max2}$, $I_{max3}$.

20. A method according to claim 16, further comprising the step setting the drive current for holding the movable component in the end position from the time $t_2$ to the setpoint value early, in that tendencies of the direction of change of the drive current are evaluated early from a state recognition device.

21. A method according to claim 17, further comprising the step of setting the drive current for holding the movable component in the end position from the time $t_2$ to the setpoint value early, in that tendencies of the direction of change of the drive current ar evaluated early from a state recognition device.

22. A method according to claim 5, wherein the number x is 7.

23. A method according to claim 7, wherein the number y is 11.

24. A method according to claim 11, wherein the number u is 14.

25. A method according to claim 13, wherein the number v is 16.

* * * * *